Sept. 24, 1957    J. BRIECHLE    2,807,332
AIR LINE LUBRICATOR
Filed Sept. 16, 1954    3 Sheets-Sheet 1
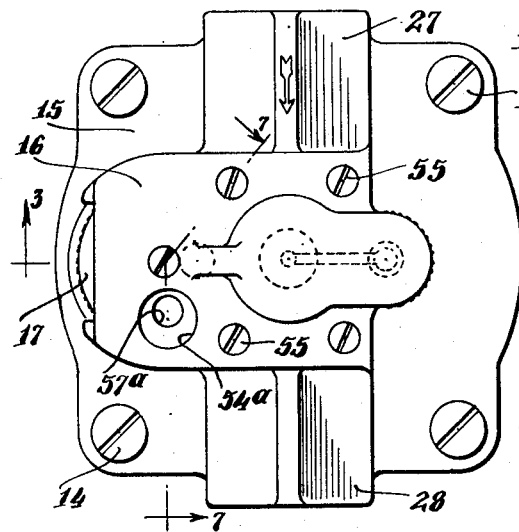
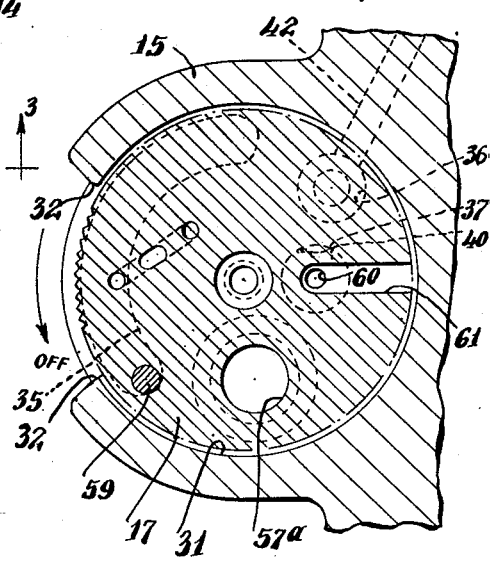
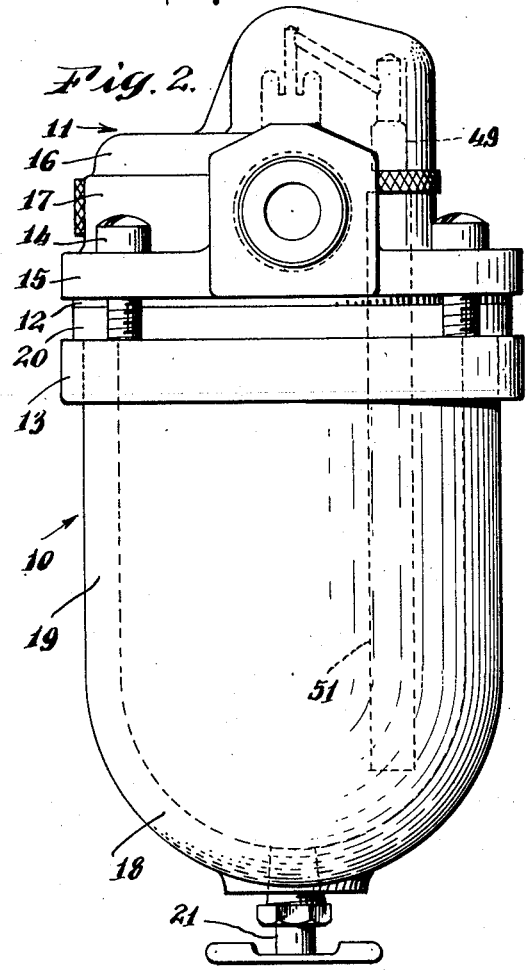
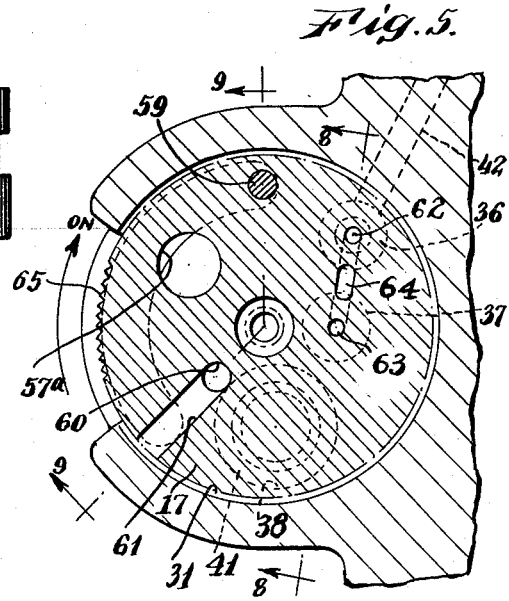
INVENTOR.
Joseph Briechle
BY
Churchill, Rich, Weymouth & Engel
ATTORNEYS.

Sept. 24, 1957   J. BRIECHLE   2,807,332
AIR LINE LUBRICATOR
Filed Sept. 16, 1954   3 Sheets-Sheet 2
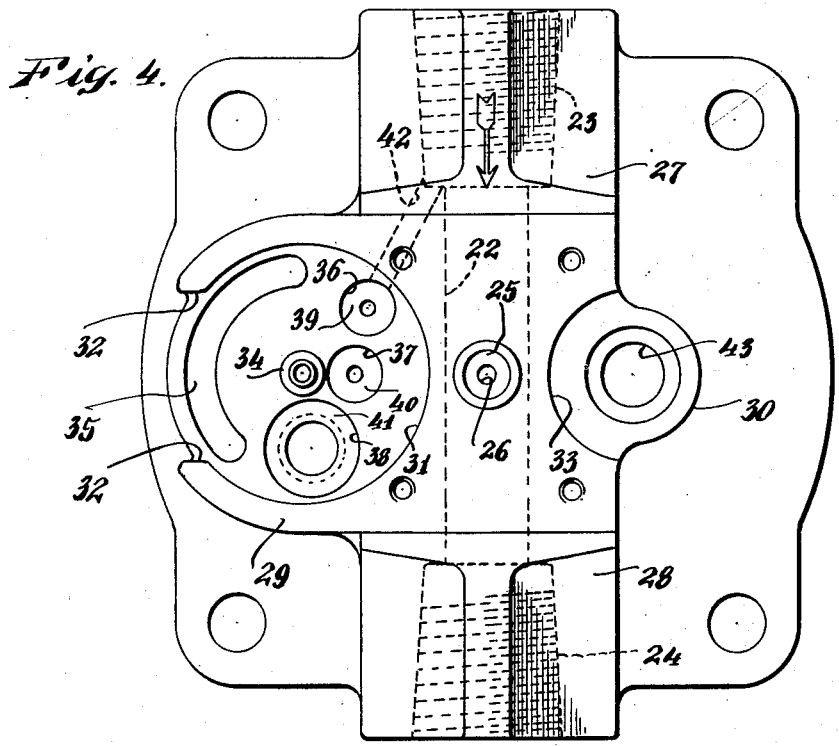
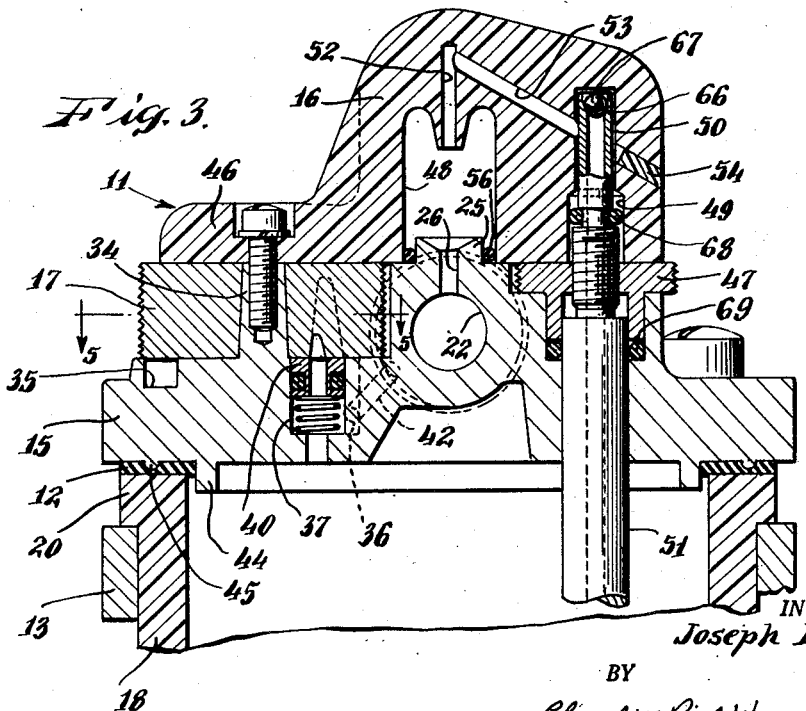
INVENTOR.
Joseph Briechle
BY
Churchill, Rich, Weymouth & Engel
ATTORNEYS.

Sept. 24, 1957  J. BRIECHLE  2,807,332
AIR LINE LUBRICATOR
Filed Sept. 16, 1954  3 Sheets-Sheet 3
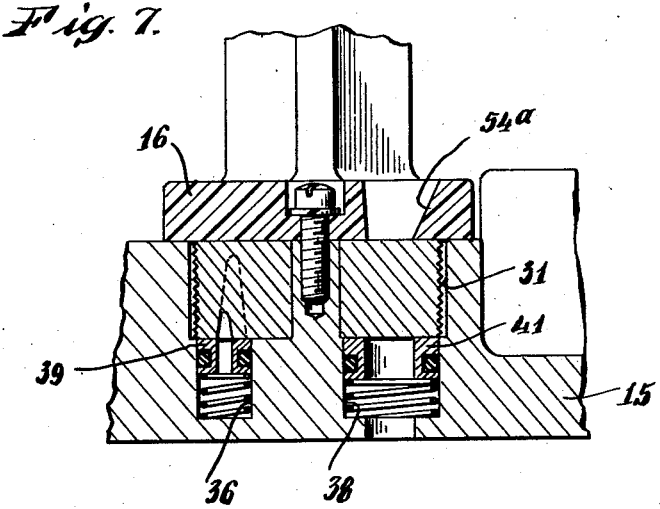
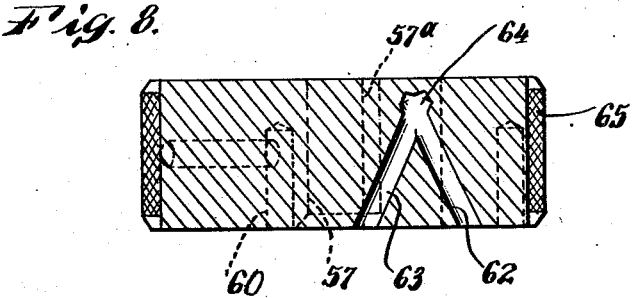
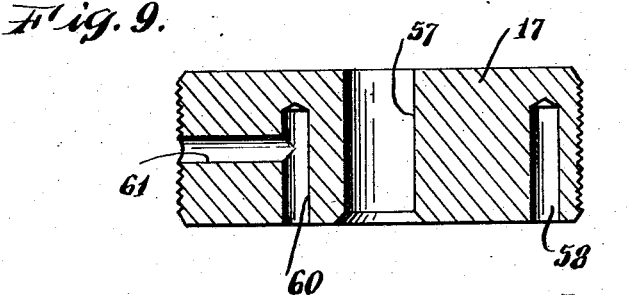
INVENTOR.
Joseph Briechle
BY
Churchill, Rich, Weymouth & Engel
ATTORNEYS.

United States Patent Office 2,807,332
Patented Sept. 24, 1957

2,807,332
AIR LINE LUBRICATOR

Joseph Briechle, New Canaan, Conn., assignor to Scovill Manufacturing Company, Waterbury, Conn., a corporation of Connecticut Application September 16, 1954, Serial No. 456,548

8 Claims. (Cl. 184—55)

The present invention relates to an air line lubricator and aims to provide certain improvements therein.

The primary object of the invention is to provide an air line lubricator which does not require the shutting off of the air supply or the removal of a closure plug or other device when the lubricant reservoir requires refilling.

A further object of the invention is to provide a device of the character set forth, provided with fool-proof means which will insure venting of air under pressure from the lubricant container prior to opening the filling hole therein.

A still further object of the invention is to provide a device of the character set forth wherein venting of air pressure acting on the lubricant in the lubricant container is accomplished in the course of presenting the filling hole to lubricant receiving position.

A still further object is to provide means for venting the air which is displaced from the container by the lubricant entering the container during the filling operation.

The foregoing and other objects of the invention, not specifically enumerated, are accomplished by providing a closure for the lubricant container comprising a manually controlled valve adapted to be moved to two limiting positions identified as "on" and "off" and wherein, in the "on" position, air under pressure is admitted to the lubricant reservoir to feed lubricant to the air under pressure passing through the lubricator, and wherein said valve, as it is being moved to its second limiting or "off" position, will shut off the supply of air to the lubricant reservoir, will vent air under pressure from the reservoir and will establish open communication between the reservoir and the atmosphere, so that lubricant may be charged into the reservoir without danger of blowback. The invention also resides in the features of construction, combination and arrangement of parts illustrated in the accompanying drawings, all of which will be hereinafter more fully described and claimed.

In the drawings:

Figure 1 is a top plan view of an air line lubricator embodying the invention;

Fig. 2 is a side elevation of the air line lubricator;

Fig. 3 is a vertical section taken substantially along the plane of the line 3—3 on Fig. 1;

Fig. 4 is a top plan view of the body member of the lubricator;

Fig. 5 is a section taken substantially along the plane of the line 5—5 on Fig. 3 and showing the position of the valve in "on" position for supplying lubricant to the air supply.

Fig. 6 is a view similar to Fig. 5 showing the valve in "off" or lubricant reservoir filling position.

Fig. 7 is a section taken along the broken line 7—7 of Fig. 1.

Fig. 8 shows a section through the valve member per se taken along the line 8—8 on Fig. 5.

Fig. 9 shows a section through the valve member per se taken along the broken line 9—9 on Fig. 5.

Referring to the drawings, the air line lubricator may be said to consist of a lubricant reservoir or container 10, the open top of which is closed by a closure member 11 which is held in air-tight engagement with the container through the medium of a packing gasket 12, a locking ring 13 and bolts 14, the closure member comprising a body member 15, a cover 16 and a valve 17.

The lubricant reservoir or container 10 is preferably formed of transparent plastic material and has a substantially hemispherical bottom 18 and a substantially cylindrical side wall 19 which, at its top, is formed with an outwardly directed, overhanging flange 20. The bottom of the container 10 is formed with an axial, screw-threaded opening into which is fitted a drain cock 21.

The body member 15, as herein shown, is preferably fabricated as a metal die-casting from zinc or other suitable metal or alloy and is of generally rectangular shape and formed with a through passageway 22, the opposite ends of which are enlarged and internally screw-threaded, as shown at 23 and 24, to accommodate coupling members attached to hose sections (not shown). Intermediate the ends of the passageway 22 and preferably down stream of the air line pressure, the body member is formed with an upwardly directed nipple 25 having a duct 26 extending therethrough and communicating with the passageway. The body member 15 at its upper surface is formed with spaced enlargements 27 and 28 within which are located the screw-threaded portions 23, 24, and with oppositely directed, substantially semi-circular enlargements 29 and 30 of less height than the enlargements 27, 28. The enlargement 29 is formed with a circular socket 31, an arcuate portion of the wall of which is omitted to leave upstanding shoulders 32, for a purpose presently to be described. The enlargement 30 is formed with a substantially semi-circular recess 33, the function for which will also be presently described. Extending upwardly and centrally from the base of the socket 31 is a stud 34 which provides a bearing for the valve 17. Formed in the base of the socket 31 is an arcuate groove 35 which is concentric with the circular wall of the socket but said arcuate groove is of greater arcuate length than said open wall, for a purpose which will presently appear. Also formed in the base of the socket 31 are a plurality of cylindrical sockets 36, 37 and 38, the socket 36 being a blind socket, whereas the sockets 37 and 38 are through sockets, although each is formed with an internal shoulder. Within the sockets 36, 37 and 38, and supported on the shoulders therein, are seal rings 39, 40 and 41, respectively, each fitted with an O-ring packing and a coil-spring to urge the seal ring upwardly. A duct 42 establishes fluid communication between the induct end of the passageway 22 and the socket 36 below the seal ring 39. The lateral enlargement 30 is formed with an opening 43 therethrough for accommodating a syphon tube and clamping nut, presently to be described. The body member 15, on its under face, is formed with an annular flange 44 for positioning the cover on the container and with a concentric, annular rib 45 for engaging the packing gasket 12.

The cover 16, which is preferably made of molded, transparent, synthetic plastic material, has a flat base 46 which overlies the top, central portion of the body member 15 and serves to hold the valve 17 and a clamping nut 47 in assembled relation on said body member. In the molding operation, the cover is formed with a socket 48 for overlying the nipple 25 on the body member, and with a socket 49, 50 for accommodating the upper end of a syphon tube 51. Ducts 52, 53 provide for fluid communication between the sockets 48 and 50. The outer end of the duct 53 may be conveniently closed by a plug 54. The cover is also formed with a through filling opening 54a in registry with the socket 38 and with a plurality of holes through which screws 55 extend and engage threaded holes in the body member 15 to secure the cover onto the body member. To insure a fluid-tight seal between the cover and the body, especially around the nipple 25, an O-ring 56 is positioned between said nipple on the wall of the socket 48.

The valve 17 is preferably formed as a metal disc and has a central through opening 57 which engages over the stud 34; a through filling opening 57a (Figs. 1, 5, 6 and 8); a blind, axially-extending socket 58 (Fig. 9) for reception of a pin 59 (Figs. 5 and 6) for engaging in the arcuate groove 35; a second blind, axially-extending socket 60 communicating with a radial socket 61 (Figs. 5, 6 and 9); and with oblique, blind sockets 62 and 63 (Fig. 8) which communicate with each other at 64. The relation and disposition of the sockets 58 and 60 to 63 are such that when the valve is mounted on the body member, rotation of the valve will establish or cut off fluid communication between said sockets and the various sockets in the base of the circular socket 31 in the body member. The flat surface of the disc valve 17 which moves over the seal rings in the body member must be exceedingly smooth so as to provide fluid-tight sealing engagement with said seal rings. As will be apparent, the diameter of the valve disc 17 is slightly smaller than the diameter of the socket 31 so as to provide for free rotation therein and venting of air from the lubricant container when the venting ducts are brought into fluid communication. To facilitate manual rotation of the valve, its peripheral surface may be knurled, as indicated at 65.

The syphon tube 51 is of a length to extend from the top of the socket 50 in the cover to near the bottom of the lubricant container 10, and at its open top is formed with a hemi-spherical socket 66 to accommodate a ball valve 67 which is adapted to be unseated by the greater pressure of the air in the container than in the duct 53, due to the venturi effect created by the reduced diameter of the through passage 22 at the duct 26 as compared with the diameters of the through passage at the opposite ends thereof. The degree to which the ball valve 67 may unseat, and thereby control or meter the flow of lubricant from the container to the through passage 22, is controlled by the adjusting nut 47 and O packing rings 68 and 69, which O-rings engage the syphon tube 51 with a greater coefficient of friction than does the adjusting nut 47, whereby, as the nut 47 is rotated, the tube 51 will not rotate therewith but on the contrary will move axially relative to the nut.

*Operation*

Let it be assumed that the lubricant container 10 contains a substantial quantity of oil and the valve disc 17 is in the "on" or lubricant supplying position to the air under pressure passing through the lubricator, as shown in Fig. 5. With the valve in the position shown, air under pressure to be supplied to an operating tool or cylinder will pass through the passageway 22 and part of said air will pass through the duct 42 to blind socket 36 below the seal ring therein and thence through the oblique communicating ducts 62 and 63 in the valve to socket 37 and therethrough into the container 10. As pressure builds up above the surface of the lubricant in container 10, the lubricant will be forced upwardly through the syphon tube 51, unseat the ball valve 67, thence pass into socket 50 and through the ducts 53 and 52 to drop into the duct 26 and be taken up by the air stream flowing through passage 22. The oil which drops from the duct 52 can be seen through the transparent plastic cover, and its rate of discharge can be regulated by rotating the adjusting nut 47 to vary the clearance between unseated ball valve 67 and its seat 66. Now let it be assumed that it is desired to replenish the lubricant in the container 10. To do so, the knurled periphery of the valve 17 is engaged by the thumb or finger of the operator and moved in the direction of the arrow in Fig. 6 until the pin 59 engages the opposite end of the arcuate groove 35. Since the arcuate movement required of the valve is considerably greater than the arcuate distance at the open wall of the socket between the shoulders 32, it will be apparent that to accomplish such movement of the valve, at least two successive engagements of the valve will be necessary. This difference in angular relationship between the limiting positions of the valve controlled by the pin 59 and the opening in the wall of the socket 35 is intentional so that, in the first step or stage of the rotary movement of the valve, the duct 62 will be moved out of communication with the socket 36 and shut off further admission of air under pressure to the container. As the valve is further rotated, the duct 60 of the valve will be brought into communication with the through socket 38 and will vent the air from the container through the duct 61 and the space between the periphery of the valve and the wall of socket 35. As the valve is further rotated to the limit of its movement, the through opening 57a in the valve will be brought into registry with both the filler opening 54a in the cover and the opening through socket 38, and thereby provide for charging or pouring of lubricant into the container. When the parts are in the relationship just described, the duct 60 will be in alignment with the passage through the socket 37 and provide for venting of air from the container which is displaced by the admitted lubricant. When the required amount of lubricant has been charged into the container, the valve is again rotated in the reverse direction to its first limiting or air supply lubricating position. It will thus be seen that there is no possibility of a blow-back of lubricant through the charging opening since the air under pressure is vented from the container prior to the charging openings being brought into registry and the air displaced by the admitted lubricant is vented through ducts 60, 61.

Although the invention as disclosed embodies certain structural features, it is to be understood that changes therein may be made within the range of engineering and mechanical skill without departing from the spirit of the invention as hereinafter claimed.

What I claim is:

1. An air line lubricator comprising a lubricant container, a closure for said container, said closure having the following: a through passageway for air under pressure, a duct adapted to establish fluid communication between said passageway and the interior of the container, a duct adapted to establish fluid communication between said passageway and the lubricant in the container, and a duct adapted to establish fluid communication between the container and the atmosphere and a manually rotatable valve having ducts therein which are portions of the aforementioned ducts, said valve ducts when said valve is at its "on" or air lubricating position, establishing fluid communication between the through passageway and the interior of the container above the lubricant and between the lubricant in the container and the through passageway downstream of the air flow to lubricate the air passing therethrough, and when said valve is at its "off" position establishing fluid communication between the interior of the container above the lubricant therein and the atmosphere and cutting off fluid communication established by the valve when in its "on" position.

2. An air line lubricator comprising a lubricant container, a closure for said container, said closure having the following: a through passageway for air under pressure, a first duct adapted to establish communication between said passageway and the interior of the container above the lubricant therein, a second duct adapted to establish lubricant communication between the lubricant in the container and said through passageway, a third duct adapted to establish fluid communication between the interior of the container above the lubricant and the atmosphere, and a filling opening through which lubricant may be charged into the container, and a manually rotatable valve having ducts therein which are portions of the aforementioned ducts; said valve ducts when said valve is at its "on" or air lubricating position, establishing fluid communication between said first duct and the interior of the container and between said second duct and said through passageway, rotation of said valve from its "on" to its "off" position operating to successively close off communication through said first duct and said second duct, establish communication through said third duct and register a through duct in the valve with the filling opening in the closure whereby lubricant may be charged into the container without blowback of air through said filling opening.

3. An air line lubricator according to claim 2 wherein means are provided for insuring that rotation of the valve from its "on" to its "off" position will be carried out in successive rotary movements, and wherein said third duct establishes communication between the container above the lubricant therein and the atmosphere to vent air under pressure from the container before the last of the successive rotary movements of the valve is completed.

4. An air line lubricator according to claim 3 wherein the rotary valve is a disc, the closure has a socket within which said disc is mounted and said socket has an arcuate opening in its side wall through which the periphery of the disc is manually engageable for rotation, the arcuate opening subtending a smaller angle than the angular movement of the disc from its "on" to its "off" position.

5. An air line lubricator comprising a lubricant container, a closure for said container, said closure having the following: a through passageway for air under pressure, a duct adapted to establish communication between said passageway and the upper interior portion of the container, a syphon connecting the lower interior portion of the container with the through passageway down stream of the air flow, said syphon comprising a movable tube extending to the lower interior portion of the container and having a floating check valve supported by the top of the tube, a fixed abutment above said check valve limiting the extent of its movement off from the top of the tube, and means for varying the depth to which the movable tube extends into the container for adjusting the extent to which the check valve may be unseated and thereby regulating the rate of flow of lubricant to the passageway.

6. An air line lubricator according to claim 5 wherein the means for varying the depth to which the tube extends into the reservoir comprises an adjustment nut engaging said tube and means for preventing rotation of the tube as the nut is rotated.

7. An air line lubricator comprising a lubricant container and a closure therefor consisting of a body member, a cover and a rotatable valve in fluid-tight engagement with the body member, said body member having a through passageway for air under pressure and ducts adapted to establish fluid communication (1) between the through passageway and the upper interior of the container, (2) between the upper interior of the container and the atmosphere, and (3) between the lower interior of the container and the through passageway farther downstream of the air flow than (1); the closure having a duct constituting part of the fluid communication duct (3); and the valve having ducts which are portions of the aforementioned ducts, and adapted to selectively establish the fluid communications (1), (2) and (3).

8. An air line lubricator according to claim 7 wherein means are provided for limiting the rotation of the valve so that in one limiting position fluid communications (1) and (3) are established and in the other limiting position fluid communication (2) is established.

References Cited in the file of this patent
UNITED STATES PATENTS

| | | |
|---|---|---|
| 720,492 | Sedberry | Feb. 10, 1903 |
| 1,576,855 | Serres | Mar. 16, 1926 |
| 2,565,691 | Ketelsen | Aug. 28, 1951 |
| 2,569,553 | Brush | Oct. 2, 1951 |
| 2,638,182 | Boretti | May 12, 1953 |
| 2,661,814 | Norgren et al. | Dec. 8, 1953 |
| 2,702,094 | Maha | Feb. 15, 1955 |